US010236507B2

(12) United States Patent
Yamaji et al.

(10) Patent No.: US 10,236,507 B2
(45) Date of Patent: Mar. 19, 2019

(54) NICKEL-MANGANESE COMPOSITE HYDROXIDE PARTICLES, METHOD FOR PRODUCING SAME, CATHODE ACTIVE MATERIAL FOR NON-AQUEOUS ELECTROLYTE SECONDARY BATTERIES, METHOD FOR PRODUCING SAME, AND NON-AQUEOUS ELECTROLYTE SECONDARY BATTERY

(71) Applicant: SUMITOMO METAL MINING CO., LTD., Tokyo (JP)

(72) Inventors: Koji Yamaji, Niihama (JP); Takehide Honma, Niihama (JP); Ryozo Ushio, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 104 days.

(21) Appl. No.: 15/115,375

(22) PCT Filed: Jan. 29, 2015

(86) PCT No.: PCT/JP2015/052526
§ 371 (c)(1),
(2) Date: Jul. 29, 2016

(87) PCT Pub. No.: WO2015/115547
PCT Pub. Date: Aug. 6, 2015

(65) Prior Publication Data
US 2017/0012288 A1    Jan. 12, 2017

(30) Foreign Application Priority Data

Jan. 31, 2014 (JP) ................................. 2014-017399

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/00* (2013.01); *C01G 53/006* (2013.01); *C01G 53/40* (2013.01);
(Continued)

(58) Field of Classification Search
None
See application file for complete search history.

(56) References Cited

U.S. PATENT DOCUMENTS

2006/0083989 A1   4/2006 Suhara et al.
2009/0029253 A1   1/2009 Itou et al.
(Continued)

FOREIGN PATENT DOCUMENTS

| CN | 101528607 A | 9/2009 |
| JP | 11-130440 | 5/1999 |

(Continued)

OTHER PUBLICATIONS

International Search Report, dated Apr. 21, 2015 from corresponding Application No. PCT/JP2015/052526.
(Continued)

*Primary Examiner* — Wyatt P McConnell
(74) *Attorney, Agent, or Firm* — Katten Muchin Rosenman LLP (57) ABSTRACT

The object of the present invention is to improve the roundness of nickel-manganese composite hydroxide particles obtained by a crystallization process, and to improve the filling characteristic of cathode active material produced using the nickel-manganese composite hydroxide particles as a precursor. A reaction aqueous solution is formed by supplying a raw material aqueous solution including at least Ni and Mn, an aqueous solution including an ammonium-ion donor, and an alkali solution into a reaction tank, and mixing, then nickel-manganese composite hydroxide par-
(Continued)

ticles are crystallized. When doing this, the oxygen concentration inside the reaction tank is controlled to be 3.0% by volume or greater, the temperature of the reaction aqueous solution is controlled to be 35° C. to 60° C., and the nickel-ion concentration is controlled to be 1,000 mg/L or greater. As a result, nickel-manganese composite hydroxide particles are obtained that include secondary particles formed by an aggregation of plural primary particles and expressed by the general formula: $Ni_xMn_yM_t(OH)_{2+\alpha}$ (where $0.05 \leq x \leq 0.95$, $0.05 \leq y \leq 0.95$, $0 \leq t \leq 0.20$, $x+y+t=1$, $0 \leq \alpha \leq 0.5$, and M is one or more elements selected from among Co, Ti, V, Cr, Zr, Nb, Mo, Hf, Ta and W); and the average value of the roundness of cathode active material having a particle size that is 70% the average particle size or more is 0.82 or greater, and the tap density is 2.20 g/cm³ or greater.

11 Claims, 3 Drawing Sheets

(51) Int. Cl.
    *H01M 4/505*        (2010.01)
    *H01M 4/04*         (2006.01)
    *H01M 10/0525*      (2010.01)
    *H01M 4/02*         (2006.01)

(52) U.S. Cl.
    CPC ............ *C01G 53/50* (2013.01); *H01M 4/043* (2013.01); *H01M 4/0471* (2013.01); *H01M 4/505* (2013.01); *C01P 2004/03* (2013.01); *C01P 2004/32* (2013.01); *C01P 2004/45* (2013.01); *C01P 2004/51* (2013.01); *C01P 2004/61* (2013.01); *C01P 2006/11* (2013.01); *C01P 2006/40* (2013.01); *H01M 10/0525* (2013.01); *H01M 2004/028* (2013.01)

(56) References Cited

U.S. PATENT DOCUMENTS

| 2010/0068624 A1 | 3/2010  | Hiratsuka et al. |
| 2012/0276454 A1 | 11/2012 | Mori et al.      |
| 2015/0037676 A1 | 2/2015  | Yamauchi et al.  |

FOREIGN PATENT DOCUMENTS

| JP | 2006-252865    | 9/2006  |
| JP | 2006-265086    | 10/2006 |
| JP | 2008-077990    | 4/2008  |
| JP | 2008-174444    | 7/2008  |
| JP | 2008-266136    | 11/2008 |
| JP | 2009-076383    | 4/2009  |
| JP | 2011-181193    | 9/2011  |
| WO | WO2004/092073  | 10/2004 |
| WO | 2011067937     | 6/2011  |
| WO | 2011/083648    | 7/2011  |
| WO | 2013/125703    | 8/2013  |
| WO | 2014/175191    | 10/2014 |

OTHER PUBLICATIONS

Tsutomu Ohzuku, et. al., Layered Lithium Insertion Material of LiNi ½Mn½O2: A Possible Alternative to LiCoO2 for Advanced Lithium-Ion Batteries, Chemical Letters 2001, Department of Applied Chemistry, Graduate School of Engineering, Osaka City University (OCU), Osaka 558-8585, Received May 7, 2001; CL-010410.
The First Office Action dated Jan. 22, 2017, from the corresponding Chinese Application No. 201580005695.5.

NICKEL-MANGANESE COMPOSITE HYDROXIDE PARTICLES, METHOD FOR PRODUCING SAME, CATHODE ACTIVE MATERIAL FOR NON-AQUEOUS ELECTROLYTE SECONDARY BATTERIES, METHOD FOR PRODUCING SAME, AND NON-AQUEOUS ELECTROLYTE SECONDARY BATTERY

TECHNICAL FIELD

The present invention relates to nickel-manganese composite hydroxide particles, a method for producing same, cathode active material for non-aqueous secondary batteries produced using the nickel-manganese composite hydroxide particles as a precursor, a method for producing same, and a non-aqueous electrolyte secondary battery using the cathode active material for non-aqueous electrolyte batteries as the cathode material.

BACKGROUND ART

With the spread of power supplies for driving motors of portable electronic devices, electric automobiles, and so on, research and development of lithium-ion secondary batteries as a kind of non-aqueous electrolyte secondary battery that can achieve superior battery characteristics such as high-energy density and high output is being carried out. As cathode active material that is used as the cathode material for a lithium-ion secondary battery, there is lithium metal composite oxide having a layered or spinel structure. Lithium-ion secondary batteries that use this lithium metal composite oxide can obtain a 4V class high voltage, and have high-energy density, so implementation is advancing.

As a lithium metal composite oxide, there is currently lithium-cobalt composite oxide ($LiCoO_2$) that can be comparatively easily synthesized, lithium-nickel composite oxide ($LiNiO_2$) that uses nickel that is less expensive than cobalt, lithium-nickel-cobalt-manganese composite oxide ($LiNi_{1/3}CO_{1/3}Mn_{1/3}O_2$), lithium-manganese composite oxide ($LiMn_2O_4$) that uses manganese, lithium-nickel-manganese composite oxide ($LiNi_{0.5}Mn_{0.5}O_2$) and the like. Of these, lithium-nickel-manganese composite oxide has a layered structure that is the same as lithium-cobalt composite oxide or lithium-nickel composite oxide, and normally, includes nickel and manganese in transition metal sites at a ratio of 1:1, does not use cobalt of which there are small deposits, and is capable of achieving superior battery characteristics such as excellent thermal stability and high capacity, so it gaining attention as a cathode active material (refer to "Chemistry Letters, Vol. 30 (2001), No. 8", pg. 744).

In order for secondary batteries that use lithium-nickel-manganese composite oxide as cathode active material to have excellent battery characteristics such as a high cycling characteristic, low resistance, and high output, preferably the cathode active material has a comparatively small particle size, narrow particle-size distribution, and high filling characteristic. In order to accomplish this, together with improving the morphology (shape and form) of the cathode active material and precursor of that cathode active material, and bringing the shape of the cathode active material closer to a spherical shape, controlling the average particle size and particle-size distribution so as to be within a suitable range is being studied. Morphology means characteristics related to the shape, form and structure of particles such as the outer shape, average particle size, the extent of particle-size distribution, primary particles, tap density and the like.

Here, as methods for producing lithium-nickel-manganese composite oxide, there are methods such as a method of wet mixing nickel oxide powder, manganese oxide powder and lithium oxide powder, after which the mixture is sprayed and dried to form a granulated powder and then calcining that powder, and a method of precipitating out nickel-manganese composite hydroxide by a crystallization reaction, then mixing that nickel-manganese composite hydroxide with a lithium compound and calcining the mixture. Of these methods, the method of using a crystallization reaction is such that by suitably regulating the reaction conditions, not only is it possible to uniformly disperse nickel and manganese on a molecular level, it is also possible to obtain a nickel-manganese composite hydroxide having a suitable particle size, a narrow particle-size distribution, and excellent filling characteristic. Moreover, generally, the lithium-nickel-manganese composite oxide takes on the particle characteristics of the precursor, so by using this kind of nickel-manganese composite hydroxide as a precursor, it is possible to obtain lithium-nickel-manganese composite oxide that not only has a uniform composition, but also has a suitable particle size, narrow particle-size distribution and excellent filling characteristic.

JP2006-252865 (A), JP2008-266136 (A) and WO2004/092073 (A1) disclose methods of crystallizing nickel-cobalt-manganese composite hydroxide by continuously or intermittently supplying a nickel-cobalt-manganese salt aqueous solution, an alkali aqueous solution, and an aqueous solution that includes an ammonium-ion donor into a reaction tank. However, in the methods disclosed in that literature, the morphology of the obtained nickel-cobalt-manganese composite hydroxide is low, and it is not possible to sufficiently improve the filling characteristic of the cathode active material produced using that nickel-cobalt-manganese composite hydroxide as a precursor.

On the other hand, WO2013/125703 (A1) discloses a production method for producing nickel composite hydroxide in which a nickel composite hydroxide slurry is obtained while performing control so that the ratio of the average particle size per volume of secondary particles of nickel composite hydroxide that is generated inside a reaction vessel with respect to the average particle size per volume of secondary particles of the finally obtained nickel composite hydroxide is 0.2 to 0.6, after which, only the liquid component of the slurry is continuously removed with the amount of slurry being kept constant, and the crystallization reaction is continued until the size of the secondary particles becomes fixed. WO2013/125703 (A1) discloses that the nickel amine complex concentration in the reaction aqueous solution is preferably regulated to be within the range of 10 mg/L to 1,500 mg/L. With this kind of production method, it is considered possible to obtain a nickel composite hydroxide having a moderately large particle size and narrow particle-size distribution. However, the nickel composite oxide that is disclosed in WO2013/125703 (A1) is produced mainly for the purpose of improving the uniformity of particle size. Therefore, even though the shape of the obtained composite hydroxide particles is nearly spherical, the particles having a ratio of the minimum diameter and maximum diameter (minimum diameter/maximum diameter) in outward appearance to be at about 0.6 are allowed. Particularly, in the case of a nickel composite hydroxide that includes manganese, a considerable amount of particles having an elliptical shape are also included, so it is difficult to say that this nickel composite hydroxide has high morphology, and it is not possible to improve the filling characteristic of the cathode active material which is produced using this nickel composite hydroxide as a precursor.

Here, as an index for evaluating the morphology of spherical powder, there is the sphericity. However, in the case of production on an industrial scale, performing evaluation by measuring the cathode active material or nickel-manganese composite hydroxide in three dimensions and calculating the sphericity is not practical. Therefore, the morphology of the powder is typically evaluated more simply by measuring the cathode active material or nickel-manganese composite hydroxide in two dimensions, and calculating the roundness.

For example, JP2008-077990 (A) and JP2009-076388 (A) disclose a cathode active material that includes secondary particles of lithium-nickel-cobalt composite oxide that is represented by the formula: $Li_xNi_{1-y-z}Co_yMe_zO_2$ (where $0.85 \leq x \leq 1.25$, $0 < y \leq 0.5$, $0 \leq z \leq 0.5$, $0 < y+z \leq 0.75$, and the element Me is at least one element selected from among Al, Mn, Ti, Mg and Ca), and it is described that preferably the average value of the roundness of an arbitrary 100 particles that have an equivalent circle diameter that matches the average particle size becomes 0.88 or greater. According to JP2008-077990 (A), this kind of cathode active material has higher thermal stability than cathode active material that includes secondary particles having an indeterminate lump-like shape. Moreover, according to JP2009-076383 (A), by aggressively mixing the aqueous solution inside the reaction tank when generating the precursor nickel-cobalt composite hydroxide by a crystallization reaction, it is possible to make cathode active material having a roundness of 0.88 or greater.

RELATED LITERATURE

Patent Literature

[Patent Literature 1] JP2006-252865 (A)
[Patent Literature 2] JP2008-266136 (A)
[Patent Literature 3] WO2004/092073 (A1)
[Patent Literature 4] WO2013/125703 (A1)
[Patent Literature 5] JP2008-077990 (A)
[Patent Literature 6] JP2009-076383 (A)

Non-Patent Literature

[Non-patent Literature 1] Chemistry Letters, Vol. 30 (2001), No. 8, P744

SUMMARY OF INVENTION

Problems to be Solved by Invention

An object of the present invention is to improve the roundness of nickel-manganese composite hydroxide particles that are obtained from a crystallization reaction, and to improve the filling characteristic of the cathode active material which is produced using the nickel-manganese composite hydroxide as a precursor. Moreover, an object of the present invention is to provide a production method that is capable of efficient mass production of this kind of nickel-manganese composite hydroxide and cathode active material. Furthermore, an object of the present invention is to provide a non-aqueous electrolyte secondary battery that uses this kind of cathode active material.

Means for Solving Problems

The present invention relates to a production method for producing nickel-manganese composite hydroxide particles that include secondary particles that are formed by an aggregation of plural primary particles and that are expressed by the general formula: $Ni_xMn_yM_t(OH)_{2+\alpha}$ (where $0.05 \leq x \leq 0.95$, $0.05 \leq y \leq 0.95$, $0 \leq t \leq 0.20$, $x+y+t=1$, $0 \leq \alpha \leq 0.5$, and M is one or more elements selected from among Co, Ti, V, Cr, Zr, Nb, Mo, Hf, Ta and W).

Particularly, in the production method for producing nickel-manganese composite hydroxide particles of the present invention, a reaction aqueous solution is formed by supplying a raw material aqueous solution that includes at least nickel and manganese, an aqueous solution that includes an ammonium-ion donor, and an alkali solution into a reaction tank and mixing; and when crystallizing the nickel-manganese composite hydroxide particles, the oxygen concentration inside the reaction tank is controlled to be 3.0% by volume or less, the temperature of the reaction aqueous solution is controlled to be 35° C. to 60° C., and preferably 35° C. to 55° C., and the nickel-ion concentration is controlled to be 1,000 mg/L or more.

Preferably, the pH value at a reference liquid temperature of 25° C. is controlled to be within the range of 10.5 to 13.0, and the ammonium-ion concentration is controlled to be within the range of 5 g/L to 25 g/L.

Preferably, as the nickel salt and manganese salt, at least one kind selected from among the group of sulfates, nitrates and chlorides thereof is used.

Preferably, at least one kind selected from among the group of ammonia, ammonium sulfate, and ammonium chloride is used as the ammonium-ion donor.

Preferably, a sodium hydroxide aqueous solution is used as the alkali solution.

Preferably, the nickel-manganese composite hydroxide particles are recovered by causing the reaction aqueous solution inside the reaction tank to overflow.

The nickel-manganese composite hydroxide particles of the present invention include secondary particles that are formed by an aggregation of plural primary particles and that are expressed by the general formula: $Ni_xMn_yM_t(OH)_{2+\alpha}$ (where $0.05 \leq x \leq 0.95$, $0.05 \leq y \leq 0.95$, $0 \leq t \leq 0.20$, $x+y+t=1$, $0 \leq \alpha \leq 0.5$, and M is one element or more selected from among Co, Ti, V, Cr, Zr, Nb, Mo, Hf, Ta and W) and are obtained from the production method described above; and of the nickel-manganese composite hydroxide particles, the average value of the roundness of nickel-manganese hydroxide particles that have a particle size that is 70% the average particle size or more is 0.82 or greater, and the tap density is 2.20 g/cm$^3$ or greater.

Preferably, the nickel-manganese composite hydroxide particles are such that the average particle size is 7.0 μm to 25.0 μm, and the index [(d90−d10)/average particle size] that indicates the spread of the particle-size distribution is 0.80 to 1.20.

The production method for producing cathode active material for a non-aqueous electrolyte secondary battery of the present invention includes: a mixing process for obtaining a lithium mixture by mixing a lithium compound with the nickel-manganese composite hydroxide particles described above or heat-treated particles that are obtained by heat treating those particles; and a calcination process for performing calcination of the lithium mixture in an oxidizing atmosphere at 720° C. to 1,000° C.

The cathode active material for a non-aqueous electrolyte secondary battery of the present invention includes layered hexagonal crystalline lithium composite oxide particles that are expressed by the general formula $Li_{1+u}Ni_xMn_yM_tO_2$ (where $-0.05 \leq u \leq 0.50$, $0.05 \leq x \leq 0.95$, $0.05 \leq y \leq 0.95$, $0 \leq t \leq 0.20$, $x+y+t=1$, and M is one or more kind of element selected from among Co, Ti, V, Cr, Zr, Nb, Mo, Hf, Ta and W), and the average value of the roundness of cathode active material having a particle size that is 70% the average particle size or more is 0.82 or greater, and the tap density is 2.20 g/cm$^3$ or greater.

Preferably, the cathode active material for a non-aqueous electrolyte secondary battery is such that the average particle size is 7.0 μm to 25.0 μm, and the index [(d90–d10)/average particle size] that indicates the spread of the particle-size distribution is 0.80 to 1.20.

Moreover, the non-aqueous electrolyte secondary battery of the present invention includes a cathode, an anode, a separator and a non-aqueous electrolyte, and uses the cathode active material for a non-aqueous electrolyte secondary battery described above as cathode material for the cathode.

Effect of Invention

With the present invention, it is possible to improve the roundness of the nickel-manganese composite hydroxide particles that are obtained by the crystallization reaction, and to improve the filling characteristic of cathode active material that is produced using these nickel-manganese composite hydroxide particle as a precursor. Moreover, with the present invention, it is possible to provide a production method that makes it possible to efficiently mass produce such nickel-manganese composite hydroxide particles and cathode active material. Furthermore, with the present invention, by using this kind of cathode active material, it is possible to provide a non-aqueous electrolyte secondary battery that has excellent battery capacity and cycling characteristic. Therefore, the present invention has very large industrial significance.

MODES FOR CARRYING OUT INVENTION

The inventors, in order to improve the filling characteristic of cathode active material that includes manganese, tried improving the roundness of the cathode active material and the precursor nickel-manganese composite hydroxide particles based on JP2008-077990 (A) and JP2009-076383 (A). However, with the technology disclosed in that literature, when manganese content is low, roundness can be easily improved, however, as the manganese content increases, it was found that the roundness decreases.

As a result of diligent research regarding this point, the inventors learned that when trying to obtain nickel-manganese composite hydroxide from a crystallization reaction, the reason that the roundness decreases as the manganese content increases is because secondary particles are formed by overly thin primary particles aggregating into irregular shapes due to oxidation of manganese in the reaction aqueous solution. As a result of research based on this knowledge, the inventors further learned that by suppressing the oxidation of manganese by controlling the reaction atmosphere and nickel-ion concentration during the crystallization reaction so as to be within a specified range, it is possible to improve the roundness of nickel-manganese composite hydroxide particles having a large manganese content and cathode active material which is produced using these nickel-manganese composite hydroxide particles as a precursor, and to improve the filling characteristic. The present invention was completed based on this knowledge.

1. Method for Producing Nickel-Manganese Composite Hydroxide Particles

The method for producing nickel-manganese composite hydroxide particles (hereafter, referred to as "composite hydroxide particles") of the present invention is a method for producing composite hydroxide particles that include secondary particles that are formed by an aggregation of plural primary particles that are expressed by the general formula: $Ni_xMn_yM_t(OH)_{2+\alpha}$ (where, 0.05≤x≤0.95, 0.05≤y≤0.95, 0≤t≤0.20, x+y+t=1, 0≤α≤0.5, and M is one or more element that is selected from among Co, Ti, V, Cr, Zr, Nb, Mo, Hf, Ta and W). Particularly, in the method for producing composite hydroxide particles of the present invention, when forming a reaction aqueous solution by supplying an aqueous solution of metal compound that includes at least nickel salt and manganese salt, an aqueous solution that includes an ammonium-ion donor, and an alkali solution into a reaction tank and mixing, then crystallizing the composite hydroxide particles, the oxygen concentration inside the reaction tank is controlled to be 3.0% by volume or less, the temperature of the reaction aqueous solution is controlled to be 35° C. to 60° C., and the nickel-ion concentration is controlled to be 1,000 mg/L or more. When performing production on an industrial scale with this kind of production method (crystallization process), it is possible to efficiently obtain composite hydroxide particles having a high roundness without sacrificing productivity.

(1) Raw Material Aqueous Solution, Ammonium-Ion Donor, and Alkali Solution a) Raw Material Aqueous Solution As the raw material aqueous solution, it is possible to use an aqueous solution that includes at least nickel and manganese, or in other words, an aqueous solution in which nickel salt and manganese salt are dissolved. As the nickel salt and manganese salt, it is possible to use at least one kind selected from among the group of sulfates, nitrates and chlorides thereof. Of these, from the aspect of cost and treatment of liquid waste, preferably their sulfates are preferred.

The total concentration of nickel and manganese of the raw material aqueous solution is preferably 1.0 mol/L to 2.4 mol/L, and more preferably 1.2 mol/L to 2.2 mol/L. When the concentration of the raw material aqueous solution is less than 1.0 mol/L, the concentration is too low, so there is a possibility that primary particles of the composite hydroxide particles (secondary particles) will not grow sufficiently. On the other hand, when the concentration of raw material aqueous solution is greater than 2.4 mol/L, the concentration is greater than the saturation concentration at normal temperature, so there is a danger that crystals will precipitate out again, and piping will become clogged. Moreover, there is a possibility that the amount of nuclei generated will increase and that the ratio of minute particles in the obtained composite hydroxide will increase. The percentage of nickel and manganese in the raw material aqueous solution is preferably adjusted so as to become the same as the composition ratio of nickel and manganese in the target composite hydroxide particles.

b) Aqueous Solution Including Ammonium-Ion Donor

As long as it is possible to form a nickel amine complex inside the reaction aqueous solution, any aqueous solution that includes an ammonium-ion donor can be used without being particularly limited. More specifically, it is possible to use at least one kind selected from among the group of ammonia water, ammonium sulfate aqueous solution, and ammonium chloride aqueous solution. Of these, from the aspect of ease of handling, using ammonium water is preferred.

c) Alkali Solution

As the alkali solution, it is possible to use a typical alkali metal hydroxide aqueous solution such as sodium hydroxide, potassium hydroxide and the like. Of these, from the aspect of cost and ease of handling, using a sodium hydroxide aqueous solution is preferred. The alkali metal hydroxide can be directly added to the reaction aqueous solution, however, from the aspect of the ease of pH control, preferably is added as an aqueous solution. In that case, the concentration of the alkali metal hydroxide aqueous solution is preferably 12% by mass to 30% by mass, and more preferably 20% by mass to 30% by mass. When the concentration of alkali metal hydroxide aqueous solution is less than 12% by mass, the amount supplied to the reaction tank increases, and there is a possibility that there will not be sufficient particle growth. On the other hand, when the concentration of alkali metal hydroxide aqueous solution is greater than 30% by mass, the pH value becomes high locally in the location where the alkali metal hydroxide was added, and there is a possibility that minute particles will be generated.

(2) Reaction Aqueous Solution a) Nickel-Ion Concentration

[Nickel-Ion Concentration]

In the present invention, it is necessary to perform control so that the nickel-ion concentration of the reaction aqueous solution that was formed by supplying the raw material aqueous solution, aqueous solution that includes an ammonium-ion donor, and alkali solution into a reaction tank and mixing is within a specified range. It is more difficult to form an amine complex with manganese than nickel, and the manganese-ion concentration hardly changes due to fluctuation of the ammonium-ion concentration and the pH value in the reaction aqueous solution, so it is possible to ignore the effects of the change of manganese-ion concentration as long as the crystallization reaction is performed under the conditions of the present invention.

More specifically, it is necessary to perform control so that the nickel-ion concentration becomes 1,000 mg/L or greater, and preferably 1,200 mg/L or greater, and even more preferably 1,600 mg/L. By forming nickel amine in the reaction aqueous solution and controlling the nickel-ion concentration to be within the range described above, it is possible to improve the morphology and to obtain composite hydroxide particles having a high roundness. However, when the nickel-ion concentration in the reaction aqueous solution becomes less than 1,000 mg/L, there is an insufficient amount of nickel that is required for particle growth, so the crystallinity becomes low, and secondary particles that are an aggregation of undeveloped irregular shaped primary particles are formed. As a result, the crystallinity of the obtained composite hydroxide particles (secondary particles) breaks down, and the roundness decreases.

It is possible to improve the roundness by increasing the nickel-ion concentration; however, when the nickel-ion concentration becomes greater than 5,000 mg/L, the amount of nickel remaining in the reaction aqueous solution increases, and not only does it become easy for a breakdown in the composition to occur, the amount of nickel lost increases, which invites an increase in cost. Therefore, in order to improve the roundness while also suppressing an increase in cost, it is necessary to control the nickel-ion concentration so as to preferably be 5,000 mg/L or less, and more preferably 2,500 mg/L or less, and even more preferably 2,000 mg/L or less.

[Control of Nickel-Ion Concentration]

The nickel-ion concentration in the reaction aqueous solution is suppressed by controlling the temperature of the reaction aqueous solution and the atmosphere inside the reaction tank to be within a fixed range, and adjusting the pH value and ammonium-ion concentration of the reaction aqueous solution. In other words, in order to control the nickel-ion concentration so as to be within the range described above, it is necessary to control the temperature of the reaction aqueous solution and the atmosphere inside the reaction tank to be within ranges that will be described later, adjust the amount of alkali solution and ammonium-ion donor supplied, control the pH value of the reaction aqueous solution at a reference liquid temperature of 25° C. to preferably be in the range of 10.5 to 13.0, and more preferably 11.5 to 13.0, and control the ammonium-ion concentration to preferably be in the range of 5 g/L to 25 g/L, and more preferably 5 g/L to 20 g/L, and even more preferably 10 g/L to 20 g/L.

In regard to this, when the ammonium-ion concentration is less than 5 g/L or the pH value is greater than 13.0, the solubility of nickel becomes too low, so the amount of nuclei generated increases, and not only does it become difficult to grow the composite hydroxide particles to a specified size, there is a possibility that the ratio of minute particles will increase, and the particle-size distribution will worsen. On the other hand, when the pH value is less than 10.5 or the ammonium-ion concentration is greater than 20 g/L, the solubility of nickel becomes too high, so the amount of nickel remaining in the reaction aqueous solution increases, and not only does it become easy for the composition to break down, the amount of nickel lost increases, which invites an increase in the cost.

b) Oxygen Concentration

As described above, the manganese in the reaction aqueous solution is easily oxidized by a small amount of oxygen, and the primary particles become minute. Such a tendency becomes more prominent the more the amount of manganese included in the composite hydroxide particles increases. Therefore, in order to improve the roundness of the composite hydroxide particles (secondary particles) that include much manganese, it is necessary to suppress the oxidation of manganese in the reaction aqueous solution.

From this aspect, in the present invention, an inert gas such as nitrogen or argon is introduced into the reaction tank, and the oxygen concentration in the reaction tank is controlled to be 3.0% by volume or less, and preferably 1.0% by volume or less, and even more preferably 0.3% by volume or less. As a result, it becomes possible to grow primary particles while at the same time suppress oxidation of manganese. Moreover, the growth of primary particle proceeds in the state of formed secondary particles, so it is possible to cause secondary particles to grow isotropically, and to obtain composite hydroxide particles that have excellent crystallinity and a high roundness. On the other hand, when the oxygen concentration is greater than 3.0% by volume, it is not possible to suppress the oxidation of manganese in the reaction aqueous solution, and it is not possible to improve the roundness of the obtained composite hydroxide particles.

c) Temperature of Reaction Aqueous Solution

The temperature of the reaction aqueous solution is controlled to be within the range of 35° C. to 60° C., and preferably 35° C. to 55° C., and more preferably 35° C. to 45° C. When the temperature of the reaction aqueous solution is less than 35° C., the solubility of nickel becomes too low, so the amount of nuclei generated increases, and not only does it become difficult to grow the composite hydroxide particles to a specified size, the ratio of minute particles increases and the particle-size distribution worsens. On the other hand, when the temperature is greater than 60° C., not only does the solubility of nickel become high, the volatilization of ammonia becomes intense, and it becomes difficult to control the ammonium-ion concentration of the reaction aqueous solution to be within the specified range. Moreover, the crystallinity of the obtained composite hydroxide particles degrades, and the roundness of the particles decreases.

(3) Reaction Tank and Recovery Method

The apparatus (reaction tank) for producing the composite hydroxide particles of the present invention is not particularly limited as long as there is provided with a means for mixing, and as long as it is possible to continuously supply a raw material aqueous solution that includes at least nickel and manganese and an aqueous solution that includes an ammonium-ion donor at a fixed rate, and to supply an alkali solution while adjusting the amount added. Preferably, there is also provided with a means for controlling the temperature, a means for controlling pH value, and the like.

The recovery method for recovering the generated composite hydroxide particles is also not particularly limited, however preferably the method continuously recovers particles by causing the reaction aqueous solution inside the reaction tank to overflow. With this kind of recovery method, it is possible to lower the apparent metal-ion concentration of the reaction aqueous solution and prevent particle growth from becoming stagnant, while at the same time achieve high productivity.

2. Nickel-Manganese Composite Hydroxide Particles

The composite hydroxide particles of the present invention are obtained by the production method described above, and are expressed by the general formula: $Ni_xMn_yM_t(OH)_{2+\alpha}$ (where, $0.05 \leq x \leq 0.95$, $0.05 \leq y \leq 0.95$, $0 \leq t \leq 0.20$, $x+y+t=1$, $0 \leq \alpha \leq 0.5$, and M is one or more elements selected from among Co, Ti, V, Cr, Zr, Nb, Mo, Hf, Ta and W); and these composite hydroxide particles include secondary particles that are formed from an aggregation of plural primary particles, in which, of these composite hydroxide particles, the average value of the roundness of the composite hydroxide particles that have a particle size that is 70% the average particle size or more is 0.82 or greater, and the tap density is 2.20 g/cm³ or greater. These composite hydroxide particles can be evaluated as having a high roundness, and by using these particles as a precursor, it is possible to obtain cathode active material having a high roundness and an excellent filling characteristic.

(1) Composition Ratio

Nickel (Ni) contributes to the improvement of the battery capacity. The value 'x' that indicates the amount of nickel included is 0.05 to 0.95, and preferably 0.10 to 0.90, and more preferably 0.20 to 0.75. When the value 'x' is less than 0.05, the battery capacity of a secondary battery that uses cathode active material that is produced using these composite hydroxide particles as a precursor decreases. On the other hand, when the value 'x' is greater than 0.95, the thermal stability decreases, and when a secondary battery that uses cathode active material that is produced using these composite hydroxide particles as a precursor is stored or used in a high-temperature environment, it is not possible to obtain sufficient characteristics.

Manganese (Mn) is an element that contributes to the improvement of thermal stability. The value 'y' that indicates the amount of manganese included is 0.05 to 0.95, and preferably 0.10 to 0.90, and more preferably 0.25 to 0.80. When the value 'y' is less than 0.05, it is not possible to sufficiently improve the thermal stability. On the other hand, when the value 'y' is greater than 0.95, a spinel phase occurs in the cathode active material that is produced using these composite hydroxide particles as a precursor, which causes a decrease in the battery characteristics, such as the output characteristics.

In addition to nickel and manganese, the composite hydroxide particles of the present invention can also include a specified amount of an additional element(s) M. As a result, it is possible to improve the characteristics of a secondary battery that uses cathode active material that is produced using these composite hydroxide particles as a precursor.

As this kind of additional element M, it is possible to use one or more elements selected from among cobalt (Co), titanium (Ti), vanadium (V), chromium (Cr), zirconium (Zr), niobium (Nb), molybdenum (Mo), hafnium (Hf), tantalum (Ta), and tungsten (W). These additional elements M can be appropriately selected according to the usage or required performance of a secondary battery in which the obtained cathode active material will be used.

The value 't' that indicates the amount of additional element(s) M included is 0 to 0.20, and preferably 0 to 0.15, and more preferably 0 to 0.10. When the value 't' is greater than 0.20, the metal element that contributes to the Redox reaction is reduced, so the battery capacity is decreased.

In the crystallization process, the additional element(s) M can be crystallized together with the nickel and manganese and uniformly dispersed in the composite hydroxide particles, and it is also possible to cover the additional element(s) M on the surface of the composite hydroxide particles after the crystallization process. Moreover, in the mixing process, it is possible to mix a lithium compound with the composite hydroxide particles, and it is also possible to combine these methods. In either method used, it is necessary to adjust the amount included so that the composition is according to the general formula described above.

(2) Roundness

In the present invention, it is important that the average value of the roundness $Y_1$ of the composite hydroxide particles that have a particle size that is 70% the average particles size (volume average particle size) or more be controlled to be 0.82 or greater, and preferably 0.83 or greater. By controlling the average value of the roundness $Y_1$ to be within such a range, it is possible to make the average value of the roundness $Y_2$ of the cathode active material that is produced using these composite hydroxide particles as a precursor to be within the specified range (0.82 or greater). On the other hand, when the average value of the roundness $Y_1$ is less than 0.82, the average value of the roundness $Y_2$ of the cathode active material also decreases, and it is not possible to improve the filling characteristic.

In the present invention, the method for calculating the average value of the roundness $Y_1$ of the composite hydroxide particles, and the reason that the target particles for evaluating the roundness $Y_1$ is limited to composite hydroxide particles that have a particle size that is 70% the average particle size or more is the same as in the case of the cathode active material that will be described later, so an explanation will be omitted here.

(3) Tap Density

In the present invention, together with regulating the average value of the roundness $Y_1$ of the composite hydroxide particles having a particle size that is 70% the average particle size or more to be 0.82 or greater, the tap density of the overall composite hydroxide particles must be regulated to be 2.20 g/cm$^3$ or greater, and preferably 2.30 g/cm$^3$ or greater, and more preferably 2.35 g/cm$^3$ or greater. When the tap density is less than 2.20 g/cm$^3$, even though the average value of the roundness $Y_1$ is 0.82 or greater, it is not possible to sufficiently improve the filling characteristic of cathode active material that is produced using the composite hydroxide particles as a precursor. On the other hand, the larger the tap density the better, and the upper value for the tap density is no particularly limited, however, when producing composite hydroxide particles under normal conditions, a tap density of about 3.30 g/cm$^3$ becomes the upper limit value.

In the present invention, the tap density is based on JIS Z-2504 and means the bulk density attained after tapping a sample powder collected in a container 100 times. The tap density can be measured by using a shaking type specific gravity measurement device.

(4) Average Particle Size

In the present invention, the average particle size of secondary particles must be adjusted to preferably be within the range of 7.0 μm to 25.0 μm, and more preferably 7.0 μm to 17.0 μm, and even more preferably 7.0 μm to 15.0 μm, and most preferably 8.0 μm to 11.0 μm. Here, the average particle size means the volume average particle size, and can be found by using a laser beam diffraction scattering type particle size distribution meter. When the average particle size of secondary particles is less than 7.0 μm, it becomes difficult to regulate the tap density to be within the range described above. On the other hand, when the average particle size of secondary particles is greater than 25.0 μm, the specific surface area of cathode active material that is produced using these composite hydroxide particles as a precursor decreases, so when a secondary battery is made using this cathode active material, the boundary surface with the electrolyte decreases, which invites a rise in the cathode resistance and a drop in the output characteristic.

In the case of the composite hydroxide particles of the present invention, the average particle size of primary particles must be appropriately adjusted according to the size of the target secondary particles, and is not particularly limited. However, in a normal production method, when the primary particles are excessively fine, the primary particles become aggregated in an irregular shape and the roundness of the obtained composite hydroxide particles (secondary particles) decreases. On the other hand, in the production method of the present invention described above, even in the case of production on an industrial scale, the primary particles are prevented from becoming excessively fine, so it is possible to control the size to be within a suitable range.

(5) Particle-Size Distribution

In the case of the composite hydroxide particles of the present invention, [(d90−d10)/average particle size], which is an index that indicates the spread of the particle-size distribution, is preferably 0.80 to 1.20, and more preferably 0.80 to 1.10, and even more preferably 0.85 to 1.10. When [(d90−d10)/average particle size] is less than 0.80, the particle size of the composite hydroxide particles becomes too uniform, so it becomes difficult to regulate the tap density to be within the range described above. However, when [(d90−d10)/average particle size] is greater than 1.20, the ratio of minute particles and coarse particles in the composite hydroxide particles increases and there is a possibility that safety and the cycling characteristic will decrease.

The term d10 in the index [(d90−d10)/average particle size] means the particle size at which the accumulation volume of the particles becomes 10% of the total volume of all of the particles when particles at each particle size are accumulated from the smallest particle size toward the largest particle size. Moreover, d90 means the particle size at which the accumulation volume of the particles becomes 90% of the total volume of all of the particles when particles at each particle size are accumulated from the smallest particle size toward the largest particle size. The method for finding d90 and d10 is not particularly limited, however, for example, can be found from a volume integrated value measured by a laser beam diffraction scattering type particle analyzer.

3. Method for Producing Cathode Active Material for Non-Aqueous Electrolyte Secondary Battery The method for producing cathode active material of the present invention uses the composite hydroxide particles described above as a precursor, and as long as it is possible to form a cathode active material that has the specified roundness $Y_2$, average particle size and particle-size distribution, the method is not particularly limited. However, presuming that production is on an industrial scale, preferably cathode active material is formed by a production method that has a mixing process for mixing a lithium compound with the composite hydroxide particles described above to obtain a lithium mixture, and a calcination process for calcining the obtained lithium mixture in an oxidizing atmosphere at 720° C. to 1,000° C. When necessary, it is also possible to add processes such as a heat-treatment process, pre-calcination process and the like to the method for producing the cathode active material of the present invention.

(1) Heat-Treatment Process

In the method for producing cathode active material of the present invention, it is possible to arbitrarily provide a heat-treatment process before the mixing process, and to mix composite hydroxide particles with a lithium compound after becoming heat-treated particles. Here, heat-treated particles include not only composite hydroxide particles from which excess moisture has been removed, but also nickel-manganese composite oxide particles that have been converted to an oxide by a heat-treatment process (hereafter, referred to as "composite oxide particles"), or a mixture of these.

The heat-treatment process is a process for removing excess moisture that is included in composite hydroxide particles by heating the composite hydroxide particles at a specified temperature. As a result, it is possible to reduce the amount of moisture that remains up until after the calcination process, and to suppress variation in the composition of the obtained cathode active material.

The heat-treatment temperature in the heat-treatment process is 105° C. to 750° C. When the heat-treatment temperature is less than 105° C., the excess moisture in the composite hydroxide particles cannot be removed, and it may not be possible to sufficiently suppress variation. On the other hand, when the heat-treatment temperature is greater than 750° C., further effect cannot be expected, and the production cost increases.

The atmosphere in which heat treatment is performed is not particularly limited as long as the atmosphere is a non-reducing atmosphere; however, preferably heat treatment is performed in a current of air in which heat treatment can be performed easily.

Moreover, the heat-treatment time is not particularly limited; however, from the aspect of sufficiently removing excess moisture in the composite hydroxide particles, the time is preferably one hour or more, and more preferably 5 hours to 15 hours.

(2) Mixing Process

The mixing process is a process in which a lithium compound is mixed into the composite hydroxide particles or heat-treated particles described above to obtain a lithium mixture.

In the mixing process, it is necessary to mix composite hydroxide particles or heat-treated particles and lithium compound so that the ratio (Li/Me) of the metal atoms other than lithium in the lithium mixture, or more specifically, the total number of atoms (Me) of nickel, manganese and additional element(s) M, and the number of lithium atoms (Li) becomes 0.95 to 1.50, and preferably 0.95 to 1.30, and more preferably 1.00 to 1.20. In other words, the ratio Li/Me does not change before and after the calcination process, so it is necessary to mix the composite hydroxide particles or heat-treated particles so that the ratio Li/Me in the mixing process becomes the ratio Li/Me in the target cathode active material.

The lithium compound that is used in the mixing process is not particularly limited, however, from the aspect of ease of procurement, preferably lithium hydroxide, lithium nitrate, lithium carbonate, or a mixture of these is used. Particularly, when the ease of handling or the stability of product quality is taken into consideration, preferably lithium hydroxide or lithium carbonate is used.

The composite hydroxide particles or heat-treated particles and the lithium compound are preferably mixed sufficiently so that fine powder does not occur. When mixing is not sufficient, variation will occur in the Li/Me ratio among individual particles, and it may not be possible obtain sufficient battery characteristics. A typical mixer can be used for mixing. For example, a shaker mixer, a Loedige mixer, a Julia mixer, a V blender and the like can be used.

(3) Pre-Calcination Process

When lithium hydroxide or lithium carbonate is used as the lithium compound, it is possible to perform a pre-calcination process on the lithium mixture after the mixing process and before the calcination process at a lower temperature than the calcination temperature that will be described later; with this process being performed at 350° C. to 800° C., and preferably 450° C. to 780° C. As a result, it is possible to sufficiently disperse lithium inside the composite hydroxide particles or heat-treated particles, and thus it is possible to obtain more uniform lithium composite oxide particles.

The holding time at the temperature above is preferably 1 hour to 10 hours, and more preferably 3 hours to 6 hours. Moreover, the atmosphere in the pre-calcination process, as in the case of the calcination process described later, is preferably an oxidizing atmosphere, and more preferably is an atmosphere in which the oxygen concentration is 18% by volume to 100% by volume.

(4) Calcination Process

The calcination process is a process for obtaining lithium-nickel-manganese composite oxide particles (hereafter, referred to as "lithium composite oxide particles") by calcining the lithium mixture that was obtained in the mixing process under specified conditions and then cooling to room temperature. In the present invention, the calcination furnace that is used in the calcination process is not particularly limited, however, from the aspect of adequately controlling the atmosphere inside the furnace, preferably an electric furnace in which gas is not generated is used, and it is possible to use either a batch-type or continuous-type furnace.

The calcination temperature is 720° C. to 1,000° C., and preferably 800° C. to 950° C., and more preferably 850° C. to 950° C. When the calcination temperature is less than 720° C., lithium is not sufficiently dispersed into the composite hydroxide particles or heat-treated particles, and excess lithium or unreacted composite hydroxide particles or heat-treated particles remain, or the crystallinity of the obtained lithium composite oxide particles is not sufficient. On the other hand, when the calcination temperature is greater than 1,000° C., severe sintering occurs between particles, which causes abnormal particle growth, and there is a possibility that the percentage of irregular-shaped coarse particles will increase.

The holding time at the calcination temperature (calcination time) is 2 hours to 12 hours, and preferably 4 hours to 10 hours. When the calcination time is less than 2 hours, the lithium will not be sufficiently dispersed into the composite hydroxide particles or heat-treated particles, and there is a possibility that excess lithium or unreacted composite hydroxide particles or heat-treated particles will remain, or the crystallinity of the obtained lithium composite oxide particles will not be sufficient. On the other hand, when the calcination time is greater than 12 hours, severe sintering occurs between particles, which causes abnormal particle growth to occur, and there is a possibility that the percentage of irregular-shaped coarse particles will increase.

The calcination atmosphere is preferably an oxidizing atmosphere, and more preferably is an atmosphere in which the oxygen concentration is 18% by volume to 100% by volume, and it is particularly preferred that the atmosphere be a mixed atmosphere of oxygen having the oxygen concentration above and an inert gas. In other words, preferably calcination is performed in the flow of atmosphere air or oxygen. When the oxygen concentration is less than 18% by volume, there is a possibility that the crystallinity of the lithium composite oxide particles will not be sufficient.

(5) Pulverization Process

The lithium composite oxide particles that were obtained from the calcination process may undergo aggregation or light sintering. In such a case, the aggregates or sintered compacts of lithium composite oxide particles are preferably pulverized. As a result, it is possible to adjust the average particle size and particle-size distribution of the obtained cathode active material to be within a suitable range. Pulverization is an operation for loosening up aggregates in which mechanical energy is applied to aggregates of plural secondary particles that occur due to sintering necking between secondary particles during calcination, and secondary particles themselves are separated with hardly any destruction.

It is possible to use a known method as the pulverization method; for example, it is possible to use a pin mill, a hammer mill or the like. When performing pulverization, preferably the pulverization force is adjusted to be within a suitable range so that the secondary particles are not destroyed.

4. Cathode Active Material for Non-Aqueous Electrolyte Secondary Battery

The cathode active material for a non-aqueous electrolyte secondary battery of the present invention includes layered hexagonal crystalline lithium composite oxide particles that are expressed by the general formula: $Li_{1+u}Ni_xMn_yM_tO_2$ (where $-0.05 \leq u \leq 0.50$, $0.05 \leq x \leq 0.95$, $0.05 \leq y \leq 0.95$, $0 \leq t \leq 0.20$, $x+y+t=1$, and M is one or more elements selected from among Co, Ti, V, Cr, Zr, Nb, Mo, Hf, Ta and W), and the average value of the roundness of cathode active material having a particle size that is 70% the average particle size or more is 0.82 or greater, and the tap density is 2.20 g/cm$^3$ or greater. This kind of cathode active material is such that particles having a specified particle size have a high degree of roundness, and has an excellent filling characteristic, so a secondary battery that uses this cathode active material can have high capacity and excellent cycling characteristic. Moreover, in recent years, due to problems in packing and electron conductivity in secondary batteries, there is a need to keep the thickness of electrodes to several tens of microns, and, in the case of this cathode active material, it is possible to satisfy such a requirement.

(1) Composition Ratios

The value 'u' that indicates the amount of excess lithium (Li) is −0.05 to 0.50, and preferably −0.05 to 0.30, and more preferably 0.00 to 0.20. When the value 'u' is less than −0.05, the cathode resistance of a secondary battery that uses this cathode active material becomes large, so the output of the battery becomes low. On the other hand, when the value 'u' is greater than 0.50, not only does the initial discharge capacity of a secondary battery that uses this cathode active material decrease, the cathode resistance increases.

Of the components of the cathode active material, the composition ratios of nickel, manganese and additional element(s) M are the same as the composition ratios of the composite hydroxide particles described above, so an explanation here is omitted.

(2) Roundness a) Roundness

In the present invention, the average value of the roundness $Y_2$ of cathode active material having a particle size that is 70% the average particle size (volume average particle size) or more is controlled to be 0.82 or greater, and preferably 0.83 or greater, and more preferably 0.84 or greater. Such a cathode active material can be evaluated as having excellent morphology and a high filling characteristic. However, when the average value of the roundness $Y_2$ is less than 0.82, the morphology of the cathode active material worsens, and it is not possible to sufficiently improve the filling characteristic.

The roundness $Y_2$ is a value that is found from $Y_2 = 4\pi \times S/L^2$ when the area of the projected image of the cathode active material, for example, a SEM image is taken to be S, and the circumferential length is taken to be L. A value $Y_2$ of 1.0 means a perfect circle, and it means that the roundness is going away from being a perfect circle as the value $Y_2$ decreases from 1.0. Moreover, the average value of the roundness $Y_2$ means the arithmetic mean value of the roundness $Y_2$ of 20 or more arbitrarily selected particles of cathode active material.

b) Evaluation Target for Evaluating Roundness

In the present invention, the evaluation target for evaluating the roundness $Y_2$ is limited to cathode active material having a particle size that is 70% the average particle size or more. This is because in the case of cathode active material having a particle size that is less than 70% the average particle size, the secondary particles are not sufficiently developed, so it is not possible to accurately measure the roundness $Y_2$. Moreover, cathode active material having a particle size that is less than 70% the average particle size fills in between cathode active material having a larger particle size, so the effect on the filling characteristic is small. In other words, cathode active material that has a dominant effect on the roundness $Y_2$ is comparatively large cathode active material having a particle size that is 70% the average particle size or more, and when the roundness $Y_2$ of the cathode active material, including cathode active material having a particle size that is less than 70% the average particle size, is evaluated, the correlation described above between the roundness $Y_2$ and the filling characteristic is lost, and it becomes impossible to sufficiently improve the filling characteristic of the cathode active material.

In JP2008-077990 (A) and JP2009-076383 (A) described above, the evaluation target for evaluating the roundness $Y_2$ is limited to particles having an equivalent circle diameter that matches the average particle size. However, in such an evaluation method, particles having a particle size that is larger than the average particle size that has a dominant effect on the filling characteristic are not evaluated, so it is very difficult to accurately evaluate the filling characteristic using the roundness $Y_2$.

(3) Tap Density

In the present invention, together with regulating the average value of the roundness $Y_2$ of cathode active material having a particle size that is 70% the average particle size or more to be 0.82 or greater, the tap density of the overall cathode active material must be regulated to be 2.20 g/cm$^3$ or greater, and preferably 2.40 g/cm$^3$ or greater, and more preferably 2.45 g/cm$^3$ or greater. When the tap density is less than 2.20 g/cm$^3$, even though the average value of the roundness $Y_2$ is 0.82 or greater, it is not possible to sufficiently improve the filling characteristic of the cathode active material. The larger the tap density the better, and the upper limit of the tap density is not particularly limited, however, when producing cathode active material in normal conditions, the upper limit of the tap density is about 3.30 g/cm$^3$.

(4) Average Particle Size

The average particle size of the cathode active material of the present invention is preferably controlled to be 7.0 μm to 25.0 μm, and more preferably 7.0 μm to 17.0 μm, and even more preferably 7.0 μm to 15.0 μm, and most preferably 8.0 μm to 11.0 μm. When the average particle size is less than 7.0 μm, it becomes difficult to regulate the tap density to be within the range described above. On the other hand, when the average particle size is greater than 25.0 μm, the specific surface area of the cathode active material decreases, so when making a secondary battery that uses this cathode active material, the boundary surface with the electrolyte decreases, which invites a rise in cathode resistance and a decrease in the output characteristic. The meaning of the average particle size and the method for finding the average particle size is the same as for the composite hydroxide particles described above, so an explanation here is omitted.

(5) Particle-Size Distribution

In the case of the cathode active material of the present invention, [(d90−d10)/average particle size], which is an index that indicates the spread of the particle-size distribution, is preferably 0.80 to 1.20, and more preferably 0.80 to 1.10, and even more preferably 0.85 to 1.10. When [(d90−d10)/average particle size] is less than 0.80, the particle size of the cathode active material becomes too uniform, so it becomes difficult to regulate the tap density to be within the range described above. However, when [(d90−d10)/average particle size] is greater than 1.20, the ratio of minute particles and coarse particles in the cathode active material increases and there is a possibility that safety and cycling characteristic will decrease. The method for finding [(d90−d10)/average particle size] is the same as in the case of the composite hydroxide particles described above, so an explanation here is omitted.

5. Non-Aqueous Electrolyte Secondary Battery

The non-aqueous electrolyte secondary battery of the present invention includes a cathode, an anode, a separator and a non-aqueous electrolyte, and is made using the same component elements as a typical non-aqueous electrolyte secondary battery. The examples explained below are only examples, and based on the examples disclosed in this specification, the non-aqueous electrolyte secondary battery of the present invention can undergo various changes and improvements based on knowledge of one skilled in the art.

(1) Component Elements a) Cathode

The cathode of a non-aqueous electrolyte secondary battery can be made as described below, for example, using the cathode active material for a non-aqueous electrolyte secondary battery of the present invention.

First, cathode active material, conductive material and binding agent powder are mixed, and as necessary, activated carbon or solvent for the purpose of adjusting viscosity are added, and these are then mixed and kneaded to make a cathode material paste. When doing this, the respective mixture ratios in the cathode mixture paste are also important elements for determining the performance of the non-aqueous electrolyte secondary battery. When the solid component of the cathode mixture paste, not including the solvent, is taken to be 100 parts by mass, as in a cathode of a typical non-aqueous electrolyte secondary battery, preferably the amount of cathode active material included is taken to be 60 parts by mass to 95 parts by mass, the amount of conductive material included is taken to be 1 part by mass to 20 parts by mass, and the amount of binding agent included is taken to be 1 part by mass to 20 parts by mass.

The obtained cathode mixture paste is applied, for example, to the surface of an aluminum foil collector, then dried to allow the solvent to dissipate. When doing this, in order to increase the electrode density, the paste may be pressed with a roll press. In this way, the cathode can be made into a sheet-like shape. The sheet-shaped cathode is cut to an appropriate size according to the battery to be made, and is used in production of the battery. The method for producing a cathode is not limited to the procedure in the example described above, and it is also possible to use other procedures.

The conductive material is added for giving an electrode suitable electric conductivity. As the conductive material, it is possible to use, for example, graphite (natural graphite, artificial graphite, expanded graphite and the like), or a carbon-black material such as acetylene black, Ketjen black (registered trademark) and the like.

The binding agent serves the roll of binding together particles of cathode active material. As the binding agent, it is possible, for example, to use polyvinylidene fluoride (PVDF), polytetrafluoroethylene (PTFE), fluorocarbon rubber, ethylene propylene diene rubber, styrene butadiene, cellulose resin, and polyacrylic acid.

Moreover, as necessary, it is possible to add a solvent to the cathode mixture material that disperses the cathode active material, the conductive material and the activated carbon, and dissolves the binding agent. More specifically, it is possible to use an organic solvent such as N-methyl-2-pyrrolidone or the like as the solvent. It is also possible to add activated carbon to the cathode mixture material in order to increase the electric double layer capacitance.

b) Anode

It is possible to use metal lithium or a lithium alloy for the anode. Alternatively, it is possible to use a material that is formed by mixing a binding agent with an anode active material that is capable of absorption or desorption of lithium ions, and adding a suitable solvent to obtain a paste-like anode mixture material, then applying that paste-like anode mixture material to the surface of a metal foil collector that is made of copper or the like, drying and then as necessary applying pressure to increase the electrode density.

As the anode active material, it is possible to use, for example, an organic composite calcined compact such as natural graphite, artificial graphite, phenol resin and the like, and a carbon powder such as coke. In this case, as in the case of the cathode, it is possible to use a fluorocarbon resin that includes PVDF or like as the anode binding agent, and use N-methyl-2-pyrrolidone or the like as the solvent for dispersing the anode active material and the binding agent.

c) Separator

The separator separates the cathode and the anode and supports the electrolyte, and is located in between the cathode and the anode. As the separator, it is possible to use a porous thin film that is made using polyethylene, polypropylene and the like.

d) Non-Aqueous Electrolyte

The non-aqueous electrolyte is formed by dissolving a lithium salt as a supporting electrolyte into an organic solvent.

As the organic solvent, it is possible to use one kind or a mixture of two or more kinds selected from among: a cyclic carbonate such as ethylene carbonate, propylene carbonate, butylene carbonate, and trifluoro propylene carbonate; a chain polycarbonate such as diethyl carbonate, dimethyl carbonate, ethyl methyl carbonate, and dipropyl carbonate; an ether compound such as tetrahydrofuran, 2-methyltetrahydrofuran, and dimethoxyethane; a sulfur compound such as ethyl methyl sulfone, and butyl sulfone; and a phosphorous compound such as triethyl phosphate, and trioctyl phosphate.

As the supporting electrolyte, it is possible to use $LiPF_6$, $LiBF_4$, $LiClO_4$, $LiAsF_6$, $LiN(CF_3SO_2)_2$ and composite salts of these.

The non-aqueous electrolyte can also include a radical scavenger, a surfactant, a flame retardant and the like.

(2) Shape and Construction of Non-Aqueous Electrolyte Secondary Battery

A non-aqueous electrolyte secondary battery that is made using a cathode, an anode, a separator and a non-aqueous electrolyte as described above can be made into various shapes such as a cylindrical shape, layer shape and the like. No matter what shape is used, the cathode and anode form an electrode body that is layered with a separator in between, non-aqueous electrolyte is impregnated into the obtained electrode body, and collector leads or the like are used to connect between the cathode collector and a cathode terminal that leads to the outside, and between the anode collector and an anode terminal that leads to the outside, and then the non-aqueous electrolyte secondary battery is completed by sealing all of this inside a battery case.

Figure 1:
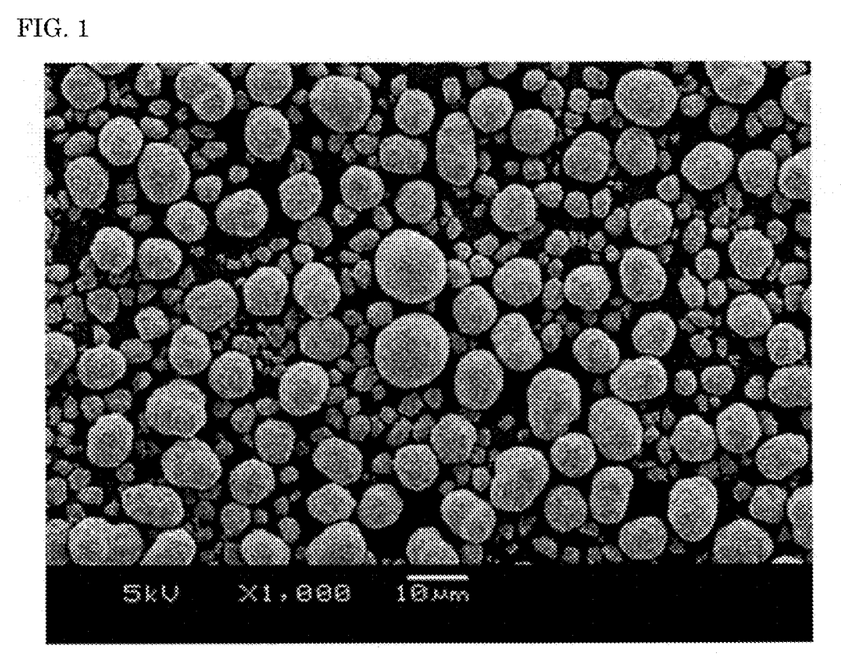
FIG. 1 is an FE-SEM photograph (observation magnification rate: 1,000×) of nickel-manganese composite hydroxide particles that were produced with the nickel-ion concentration in the reaction aqueous solution being 1,000 mg/L.
Figure 2:
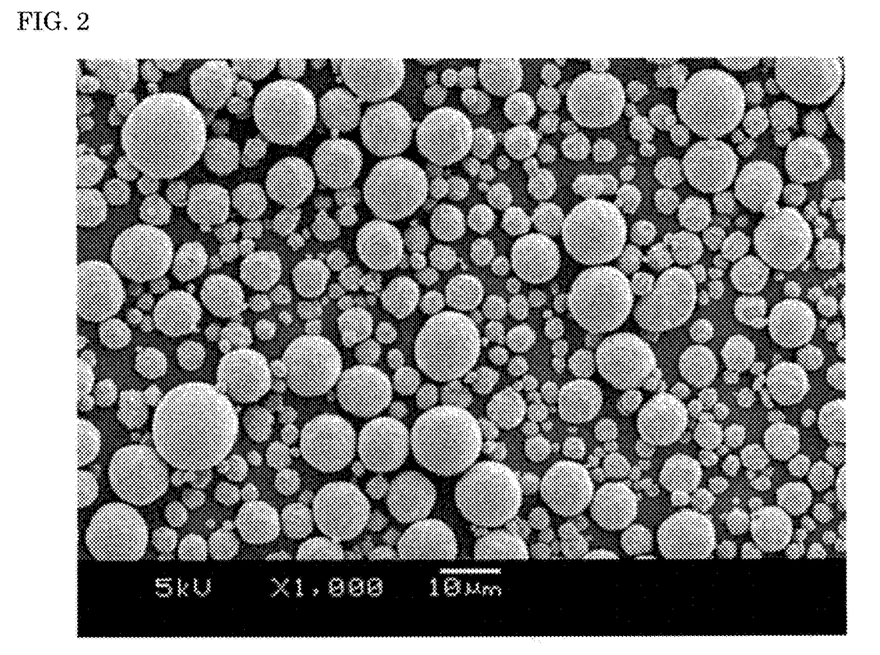
FIG. 2 is an FE-SEM photograph (observation magnification rate: 1,000×) of nickel-manganese composite hydroxide particles that were produced with the nickel-ion concentration in the reaction aqueous solution being 2,000 mg/L.
Figure 3:
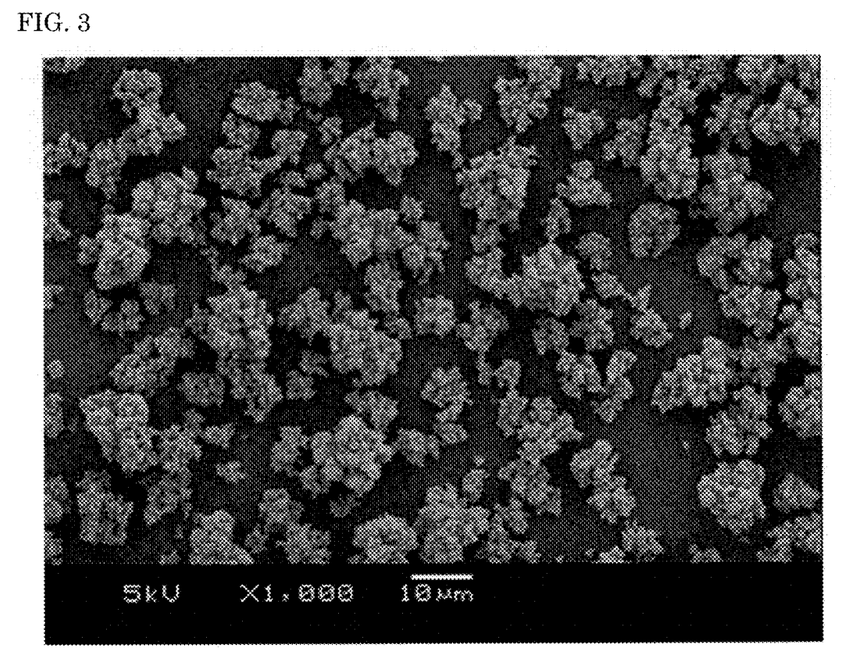
FIG. 3 is an FE-SEM photograph (observation magnification rate: 1,000×) of nickel-manganese composite hydroxide particles that were produced with the nickel-ion concentration in the reaction aqueous solution being 100 mg/L.
Figure 4:
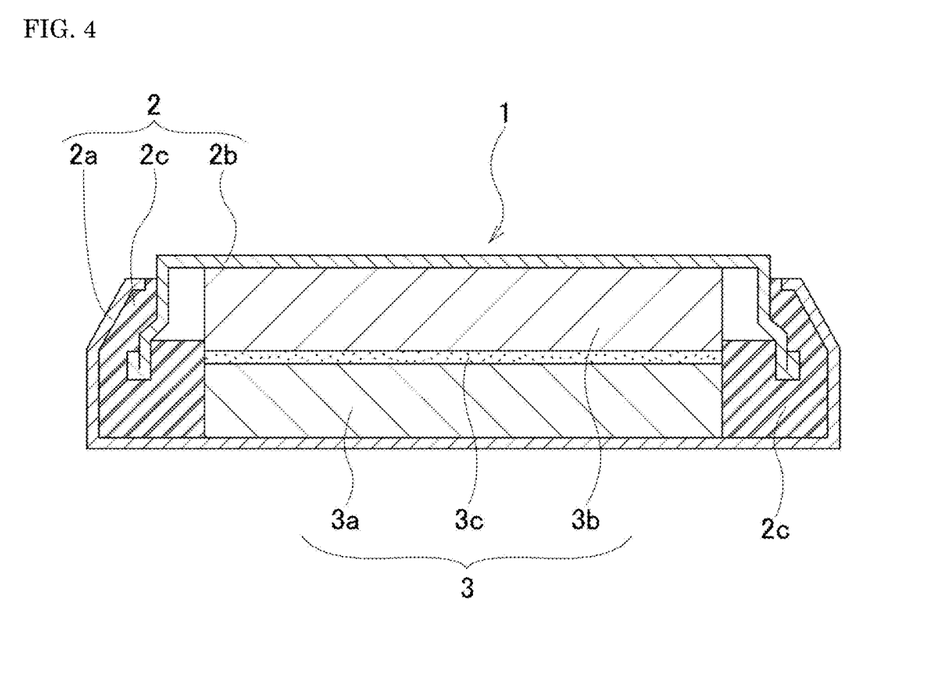
FIG. 4 is a cross-sectional view of a 2032-type coin battery that was used in battery evaluation of samples.
Figure 5:
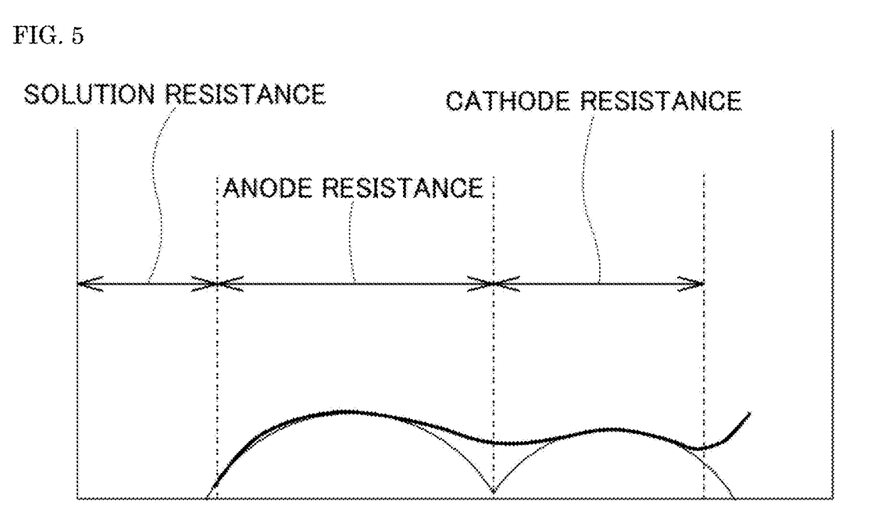
FIG. 5 is a drawing for explaining the internal resistance of a 2032-type coin battery using a plot that was obtained by alternating-current impedance measurement.

For example, the 2032-type coin battery 1 that is illustrated in FIG. 4 includes a case 2, and an electrode 3 that is housed inside the case 2. The case 2 has a cathode can 2a that is hollow and open on one end, and an anode can 2b that is arranged in the opening section of the cathode can 2a; and when the anode can 2b is arranged in the opening section of the cathode can 2a, a space that houses the electrode 3 is formed between the anode can 2b and the cathode can 2a. Moreover, the electrode 3 includes a cathode 3a, a separator 3c and an anode 3b, which are layered and housed in the case 2 in that order such that the cathode 3a comes in contact with the inner surface of the cathode can 2a, and the anode 3b comes in contact with the inner surface of the anode can 2b. The case 2 has a gasket 2c, and this gasket 2c maintains the cathode can 2a and anode can 2b in a non-contact state so relative movement is fixed. The gasket 2c also has a function of sealing off the gap between the cathode can 2a and anode can 2b, and sealing between the inside of the case 2 and the outside so as to be airtight.

(3) Characteristics

The non-aqueous electrolyte secondary battery of the present invention uses the cathode active material of the present invention as the cathode material, so the electrode density of the cathode is high and the battery can be evaluated as having high capacity and excellent cycling characteristic. More specifically, the non-aqueous electrolyte secondary battery of the present invention is such that the initial discharge capacity can be 160 mAh/g or greater, and preferably 162 mAh/g or greater, and more preferably 163 mAh/g or greater. At the same time, the non-aqueous electrolyte secondary battery of the present invention is such that the 200-cycle capacity maintenance rate is 90% or greater, and preferably 92% or greater, and more preferably 93% or greater.

EXAMPLES

In the following, examples and comparative examples will be used to explain the present invention in further detail; however, the present invention is not limited by these examples.

Example 1 a) Production of Composite Hydroxide Particles

First, nickel sulfate hexahydrate and manganese sulfate heptahydrate were dissolved in water so that the mole ratio of nickel and manganese became Ni:Mn=63:37, and the nickel and manganese concentrations were adjusted so that the total concentration in the raw material aqueous solution was 2 mol/L. On the other hand, a reaction tank having an overflow capacity of 60 L was filled to the upper limit with water, and using a water bath the temperature inside the tank was heated to 40° C. At the same time, nitrogen gas was introduced into the reaction tank at a rate of 20 L/min, to adjust the inside of the reaction tank to an inert atmosphere (oxygen concentration: 0.2% by volume).

Next, while mixing the water inside the reaction tank, the raw material aqueous solution, 25% by mass ammonia water and 25% by mass sodium hydroxide aqueous solution were continuously supplied to form a reaction aqueous solution. When doing this, together with supplying the raw material aqueous solution at a rate of 40 L/min and the ammonia water at a rate of 8 mL/min, sodium hydroxide aqueous solution was supplied so that the pH value of the reaction aqueous solution at a reference liquid temperature of 25° C. was maintained at 12.7, and the ammonium-ion concentration was maintained at 13.0 g/L, and the nickel-ion concentration of this reaction aqueous solution was adjusted to 1,000 mg/L.

The ammonium-ion concentration and the pH value of the reaction aqueous solution were respectively measured using an ammonium-ion meter (portable pH/RDO meter, manufactured by ORION) and a pH controller that were placed in the reaction tank beforehand. The nickel-ion concentration was measured using an ICP emission spectrophotometer (SPS3000, manufactured by Seiko Instruments Inc.).

In this state, the crystallization reaction was continued for 32 hours, to crystallize the slurry. After checking that the temperature, pH value, ammonium-ion concentration and nickel-ion concentration of the reaction aqueous solution were maintained according to the conditions described above, the slurry was recovered by causing the reaction aqueous solution inside the reaction tank to overflow. Powder of composite hydroxide particles was then obtained by washing, filtering and drying the slurry.

b) Evaluation of Composite Hydroxide Particles

[Composition]

The composition of the obtained composite hydroxide particles was measured using an ICP emission spectrophotometer (ICP E9000 manufactured by Shimadzu Corp.) and confirmed to be expressed by the general formula: $Ni_{0.63}Mn_{0.37}(OH)_2$.

[Average Particle Size and Particle-Size Distribution]

The average particle size of the composite hydroxide particles was found using a laser diffraction particle size analyzer (Microtrac, manufactured by Nikkiso Co., Ltd.) and confirmed to be 9.7 μm. Similarly, d90 and d10 were found, and from these values the index [(d90−d10)/average particle size] that indicates the spread of the particle-size distribution was found and confirmed to be 0.98.

[Roundness]

The shape of the composite hydroxide particles was observed using SEM (field emission type scanning electron microscope S-4700, manufactured by Hitachi, Ltd.), and the composite hydroxide particles were confirmed to be spherical secondary particles that were formed by an aggregation of plural primary particles. Next, the roundness $Y_1$ of an arbitrary 20 particles of the composite hydroxide particles having a particle size 70% the average particle size or more were measured using image processing software (imageJ), and the average value was calculated and confirmed to be 0.82. The results are given in Table 3.

In Example 1, as illustrated in Table 1, while changing the composite hydroxide particle to be measured, the roundness $Y_1$ of 150 arbitrarily selected composite hydroxide particles was measured, and the work of calculating the average value was repeated 5 times. As a result, when the composite hydroxide particles having a particle size 70% the average particle size or more were taken to be the object of measurement, it was confirmed that there was little variation in the average value of the roundness $Y_1$, and that evaluation could be stably performed. On the other hand, when the object of measurement was not limited, or when the object of measurement was taken to be the composite hydroxide particles having a particle size 50% the average particle size or more, or the composite hydroxide particles having a particle size 60% the average particle size or more, it was confirmed that there was large variation in the average value of the roundness $Y_1$, and that it was not possible to stably perform evaluation.

TABLE 1

| Roundness measurement object | Average roundness value | | | | | |
|---|---|---|---|---|---|---|
| | First time | Second time | Third time | Fourth time | Fifth time | Standard deviation |
| All particles (no limit to measurement object) | 0.803 | 0.825 | 0.809 | 0.820 | 0.819 | 0.0088 |
| 50% the average particle size or more | 0.808 | 0.827 | 0.813 | 0.822 | 0.822 | 0.0073 |
| 60% the average particle size or more | 0.819 | 0.828 | 0.817 | 0.829 | 0.829 | 0.0059 |
| 70% the average particle size or more | 0.825 | 0.830 | 0.826 | 0.830 | 0.832 | 0.0030 |

[Tap Density]

Taking the bulk density after tapping composite hydroxide particles that were collected in a container 100 times to be the tap density based on JIS Z-2504, that tap density was measured using a shaking type specific gravity measurement device (KRS-406, manufactured by Kuramochi Kagaku Kikai Co., Ltd.) and confirmed to be 2.31 g/cm$^3$.

c) Production of Cathode Active Material

Heat-treated particles were obtained by performing heat treatment of the obtained composite hydroxide particles in an air atmosphere at 150° C. for 12 hours (heat-treatment process). A lithium mixture was obtained by mixing lithium carbonate that had been weighed into the heat-treated particles so that Li/Me=1.15. A shaker mixer (TURBULA TypeT2C, manufactured by Wily A. Bachofen AG (WAB)) was used for mixing (mixing process). This lithium mixture underwent pre calcination in a flow of air (oxygen concentration: 21% by volume) at 760° C. for 4 hours, and then calcined at 950° C. for 10 hours, and cooled to room temperature to obtain lithium composite oxide particles (pre-calcination process, calcination process). A slight degree of sintering occurred in the lithium composite oxide particles after cooling, so the cathode active material was obtained by pulverizing the sintered particles (pulverization process).

d) Evaluation of Cathode Active Material

The composition, average particle size, particle-size distribution, roundness and tap density of the cathode active material obtained in this way was evaluated using the same method as in the case of composite hydroxide particles. The results are given in Table 4.

Examples 2 to 5

Except for controlling the nickel-ion concentration as illustrated in Table 2 by adjusting the ammonium-ion concentration and pH value inside the reaction tank, composite hydroxide particles and cathode active material were obtained in the same way as in Example 1, and evaluation was performed. The results are given in Table 3 and Table 4.

Example 6

Except for introducing nitrogen gas into the reaction tank at a rate of 3.0 L/min, and adjusting the oxygen concentration to 3.0% by volume, composite hydroxide particles and cathode active material were obtained in the same way as in Example 2, and evaluation was performed. The results are given in Table 3 and Table 4.

Example 7

Except for introducing nitrogen gas into the reaction tank at a rate of 9.0 L/min, and adjusting the oxygen concentration to 1.0% by volume, composite hydroxide particles and cathode active material were obtained in the same way as in Example 2, and evaluation was performed. The results are given in Table 3 and Table 4.

Examples 8 to 10

Except for controlling the nickel-ion concentration as illustrated in Table 2 by adjusting the temperature, ammonium-ion concentration and pH value of the reaction aqueous solution, composite hydroxide particles and cathode active material were obtained in the same way as in Example 2, and evaluation was performed. The results are given in Table 3 and Table 4.

Comparative Examples 1 and 2

Except for controlling the nickel-ion concentration as illustrated in Table 2 by adjusting the ammonium-ion concentration and pH value inside the reaction tank, composite hydroxide particles and cathode active material were obtained in the same way as in Example 1, and evaluation was performed. The results are given in Table 3 and Table 4.

Comparative Example 3

Except for introducing nitrogen gas into the reaction tank at a rate of 1.5 L/min and maintaining the oxygen concentration at 5.0% by volume, composite hydroxide particles and cathode active material were obtained in the same way as in Example 2, and evaluation was performed. The results are given in Table 3 and Table 4.

Comparative Example 4

Except for controlling the temperature of the reaction aqueous solution to be 30° C., composite hydroxide particles and cathode active material were obtained in the same way as in Example 2, and evaluation was performed. The results are given in Table 3 and Table 4.

Comparative Example 5

When the temperature of the reaction aqueous solution was controlled to be 65° C., the volatilization of ammonia became severe, and it became difficult to control the ammonium-ion concentration, pH value and nickel-ion concentration of the reaction aqueous solution. Therefore, in Comparative Example 5, the production of composite hydroxide particles was stopped during the crystallization reaction.

TABLE 2

(Production Conditions)

|  | Reaction Aqueous Solution Temp. (° C.) | Oxygen Concentration (% by vol.) | $NH^{4+}$ Concentration (g/L) | pH Value (at 25° C. Reference Temp.) | Ni Ion Concentration (mg/L) |
|---|---|---|---|---|---|
| Example 1 | 40 | 0.2 | 13.0 | 12.7 | 1,000 |
| Example 2 | 40 | 0.2 | 15.0 | 12.2 | 2,000 |
| Example 3 | 40 | 0.2 | 15.0 | 12.6 | 1,500 |
| Example 4 | 40 | 0.2 | 15.0 | 12.4 | 1,600 |
| Example 5 | 40 | 0.2 | 18.0 | 12.2 | 2,200 |
| Example 6 | 40 | 3.0 | 15.0 | 12.2 | 1,900 |
| Example 7 | 40 | 1.0 | 15.0 | 12.2 | 2,050 |
| Example 8 | 35 | 0.2 | 15.0 | 12.3 | 1,100 |
| Example 9 | 45 | 0.2 | 15.0 | 12.7 | 1,400 |
| Example 10 | 60 | 0.2 | 14.0 | 12.3 | 2,100 |
| CE 1 | 40 | 0.2 | 10.0 | 12.7 | 100 |
| CE 2 | 40 | 0.2 | 10.0 | 12.5 | 500 |
| CE 3 | 40 | 5.0 | 15.0 | 12.2 | 1,900 |
| CE 4 | 30 | 0.2 | 15.0 | 12.3 | 980 |
| CE 5 | 65 | 0.2 | Control is difficult | Control is difficult | Control is difficult |

\* CE: Comparative Example

TABLE 3

(Composite Hydroxide Particles)

|  | General Formula | Average Particle Size (μm) | (d90-d10)/ Average Particle Size | Roundness | Tap Density (gm/cm³) |
|---|---|---|---|---|---|
| Example 1 | $Ni_{0.63}Mn_{0.37}(OH)_2$ | 9.7 | 0.98 | 0.82 | 2.31 |
| Example 2 | $Ni_{0.63}Mn_{0.37}(OH)_2$ | 10.2 | 0.96 | 0.84 | 2.44 |
| Example 3 | $Ni_{0.63}Mn_{0.37}(OH)_2$ | 9.9 | 0.96 | 0.83 | 2.32 |
| Example 4 | $Ni_{0.63}Mn_{0.37}(OH)_2$ | 10.1 | 0.97 | 0.83 | 2.40 |
| Example 5 | $Ni_{0.63}Mn_{0.37}(OH)_2$ | 10.1 | 0.97 | 0.84 | 2.41 |
| Example 6 | $Ni_{0.63}Mn_{0.37}(OH)_2$ | 9.8 | 0.95 | 0.82 | 2.22 |
| Example 7 | $Ni_{0.63}Mn_{0.37}(OH)_2$ | 9.9 | 0.96 | 0.83 | 2.39 |
| Example 8 | $Ni_{0.63}Mn_{0.37}(OH)_2$ | 10.1 | 0.99 | 0.82 | 2.30 |
| Example 9 | $Ni_{0.63}Mn_{0.37}(OH)_2$ | 9.8 | 0.98 | 0.82 | 2.32 |
| Example 10 | $Ni_{0.63}Mn_{0.37}(OH)_2$ | 9.7 | 0.99 | 0.82 | 2.21 |
| CE 1 | $Ni_{0.63}Mn_{0.37}(OH)_2$ | 9.6 | 1.00 | 0.50 | 1.43 |
| CE 2 | $Ni_{0.63}Mn_{0.37}(OH)_2$ | 9.8 | 0.93 | 0.59 | 2.08 |
| CE 3 | $Ni_{0.63}Mn_{0.37}(OH)_2$ | 9.0 | 1.20 | 0.48 | 1.94 |
| CE 4 | $Ni_{0.63}Mn_{0.37}(OH)_2$ | 7.6 | 1.10 | 0.77 | 1.92 |
| CE 5 | $Ni_{0.63}Mn_{0.37}(OH)_2$ | — | — | — | — |

\* CE: Comparative Example (Cathode Active Material)

|  | General Formula | Average Particle Size (μm) | (d90-d10)/ Average Particle Size | Roundness | Tap Density (gm/cm³) |
|---|---|---|---|---|---|
| Example 1 | $Li_{1.15}Ni_{0.63}Mn_{0.37}O_2$ | 9.5 | 0.97 | 0.83 | 2.43 |
| Example 2 | $Li_{1.15}Ni_{0.63}Mn_{0.37}O_2$ | 10.0 | 0.95 | 0.85 | 2.56 |
| Example 3 | $Li_{1.15}Ni_{0.63}Mn_{0.37}O_2$ | 9.6 | 0.96 | 0.83 | 2.48 |
| Example 4 | $Li_{1.15}Ni_{0.63}Mn_{0.37}O_2$ | 10.0 | 0.97 | 0.84 | 2.55 |
| Example 5 | $Li_{1.15}Ni_{0.63}Mn_{0.37}O_2$ | 9.8 | 0.97 | 0.85 | 2.56 |
| Example 6 | $Li_{1.15}Ni_{0.63}Mn_{0.37}O_2$ | 9.5 | 0.93 | 0.82 | 2.33 |
| Example 7 | $Li_{1.15}Ni_{0.63}Mn_{0.37}O_2$ | 9.8 | 0.96 | 0.84 | 2.54 |
| Example 8 | $Li_{1.15}Ni_{0.63}Mn_{0.37}O_2$ | 9.9 | 0.98 | 0.83 | 2.40 |
| Example 9 | $Li_{1.15}Ni_{0.63}Mn_{0.37}O_2$ | 9.7 | 0.98 | 0.83 | 2.41 |
| Example 10 | $Li_{1.15}Ni_{0.63}Mn_{0.37}O_2$ | 9.5 | 0.97 | 0.82 | 2.34 |
| CE 1 | $Li_{1.15}Ni_{0.63}Mn_{0.37}O_2$ | 9.5 | 0.98 | 0.48 | 1.52 |
| CE 2 | $Li_{1.15}Ni_{0.63}Mn_{0.37}O_2$ | 9.6 | 0.92 | 0.60 | 2.18 |
| CE 3 | $Li_{1.15}Ni_{0.63}Mn_{0.37}O_2$ | 8.8 | 1.10 | 0.49 | 1.89 |
| CE 4 | $Li_{1.15}Ni_{0.63}Mn_{0.37}O_2$ | 7.6 | 1.10 | 0.79 | 2.01 |
| CE 5 | $Li_{1.15}Ni_{0.63}Mn_{0.37}O_2$ | — | — | — | — |

Comparative Example 11 and Comparative Example 6 a) Production of 2032-type Coin Battery

Using the cathode active material that was obtained in Examples 1 to 10 and Comparative Examples 1 to 4, 2032-type coin batteries 1 were produced such as illustrated in FIG. 4. The 2032-type coin batteries 1 include a case 2 and an electrode 3 that is housed inside the case 2.

The case 2 has a cathode can 2a that is hollow and open on one end, and an anode code 2b that is arranged in the opening section of the cathode can 2a, and when the anode can 2b is arranged in the opening section of the cathode can 2a, a space is formed between the anode can 2b and the cathode can 2a that houses the electrode 3. The electrode 3 includes a cathode 3a, a separator 3c and an anode 3b, which are layered and housed in the case 2 in that order such that the cathode 3a comes in contact with the inner surface of the cathode can 2a, and the anode 3b comes in contact with the inner surface of the anode can 2b. The case 2 has a gasket 2c, and this gasket 2c maintains an electrically insulated state between the cathode can 2a and anode can 2b. The gasket 2c also has a function of sealing off the gap between the cathode can 2a and anode can 2b, and sealing between the inside of the case 2 and the outside so as to be airtight.

This 2032-type coin battery 1 is produced as described below. First, 52.5 mg of cathode active material, 15 mg of acetylene black, and 7.5 mg of polytetrafluoroethylene resin (PTFE) are mixed, then pressed under a pressure of 100 MPa to a 11 mm diameter and a 100 μm thickness to produce a cathode 3a. The produced cathode 3a was dried in a vacuum drier at 120° C. for 12 hours. Using this cathode 3a, anode 3b, separator 3c and electrolyte, a coin-type battery was produced inside a glovebox having an Ar atmosphere that is managed so that the dew point is −80° C.

As the anode 3b, an anode sheet stamped into a disk shape having a 14 mm diameter that is formed by applying Graphite powder having an average particle size of about 20 μm and polyvinylidene fluoride to copper foil were used. A porous polyethylene film having a 25 μm film thickness was used as the separator 3c. A mixed solution having equal amounts of ethylene carbonate (EC) and diethyl carbonate (DEC) and having 1M of $LiClO_4$ as the supporting electrolyte (manufactured by Tomiyama Pure Chemical Industries, Ltd.) was used as the electrolyte.

b) Evaluation of Secondary Battery

The initial discharge capacity, the 200-cycle capacity retention rate, and the cathode resistance of the obtained 2032-type coin battery 1 were evaluated.

[Initial Discharge Capacity]

After the 2032-type coin battery 1 was produced, the battery was left alone for 24 hours, then after the open-circuit voltage (OCV) had become stable, the initial discharge capacity was found by performing a charge/discharge test in which the battery 1 was charged to a cut-off voltage of 4.8V with the current density with respect to the cathode being 0.1 $mA/cm^2$, after which charging was stopped for 1 hour, and the discharge capacity was measured after the battery 1 had discharged to a cut-off voltage of 2.5 V. When doing this, a multi-channel voltage/current generator (R6741A, manufactured by Advantest Corporation) was used for measuring the charge/discharge capacity.

[200-Cycle Capacity Retention Rate]

A cycle of charging the battery 1 to 4.8 V with a current density with respect to the cathode of 2 $mA/cm^2$, and then letting the battery 1 discharge to 2.0 V was repeatedly performed 200 times and the ratio of the discharge capacity after 200 repetitions and the initial discharge capacity was calculated to find the capacity retention rate (200-cycle capacity retention rate).

TABLE 5

|  | Cathode Active Material | Initial Discharge Capacity (mAh/g) | 200-Cycle Capacity Retention Rate (%) |
|---|---|---|---|
| Example 11 | Example 1 | 162.2 | 92.1 |
|  | Example 2 | 165.9 | 94.5 |
|  | Example 3 | 162.9 | 92.9 |
|  | Example 4 | 164.3 | 94.1 |
|  | Example 5 | 167.1 | 94.1 |
|  | Example 6 | 161.8 | 91.4 |
|  | Example 7 | 163.6 | 93.6 |
|  | Example 8 | 162.5 | 92.8 |
|  | Example 9 | 162.4 | 93.1 |
|  | Example 10 | 160.8 | 91.2 |
| Comparative Example 6 | CE 1 | 157.2 | 87.5 |
|  | CE 2 | 158.6 | 89.2 |
|  | CE 3 | 156.2 | 88.7 |
|  | CE 4 | 159.2 | 90.1 |

[Overall Evaluation]

From Tables 2 to 5, it can be seen that the composite hydroxide particles and the cathode active materials that is produced using those particles as a precursor have excellent crystallinity and roundness and a high filling characteristic. Moreover, it can be seen that for 2032-type coin batteries that use the cathode active materials of Examples 1 to 10, it is possible to simultaneously achieve an initial discharge capacity of 160 mAh/g or more and a 200-cycle capacity retention rate of 90% or more.

On the other hand, it can be seen that the composite hydroxide particles and cathode active materials of Comparative Examples 1 to 4 have low crystallinity and roundness, and inferior filling characteristic compared to the cathode active material of Examples 1 to 10. Moreover, it can also be seen that for 2032-type coin batteries that use the cathode active materials of Comparative Example 1 to 4, it is not possible to simultaneously improve the initial discharge capacity and 200-cycle capacity retention rate.

INDUSTRIAL APPLICABILITY

It can be seen as described above, that a non-aqueous electrolyte secondary battery that uses the cathode active material of the present invention has excellent battery capacity and cycling characteristic, so it is possible to make a battery more compact and lightweight. Therefore, the non-aqueous electrolyte secondary battery can be suitably used as the power supply for compact portable electronic devices such as notebook type personal computers or portable telephones that require a high capacity and high cycling characteristic. Moreover, the non-aqueous electrolyte secondary battery is also suitable as a power source for an electric automobile that has restricted installation space. Not only can the non-aqueous electrolyte secondary battery of the present invention be used as a power supply for an electric automobile that is simply driven by only electric power, but can also be used as a power source for hybrid vehicles together with an internal combustion engine such as a gasoline engine and diesel engine.

EXPLANATION OF REFERENCE CODES 1 2032-type Coin Battery
2 Case
2a Cathode can
2b Anode can
2c Gasket
3 Electrode
3a Cathode
3b Anode
3c Separator

What is claimed is:

1. A method for producing nickel-manganese composite hydroxide particles comprising secondary particles formed by an aggregation of plural primary particles and expressed by a general formula: $Ni_xMn_yM_t(OH)_{2+\alpha}$, where $0.05 \leq x \leq 0.95$, $0.05 \leq y \leq 0.95$, $0 \leq t \leq 0.20$, $x+y+t=1$, $0 \leq \alpha \leq 0.5$, and M is one or more elements selected from among Co, Ti, V, Cr, Zr, Nb, Mo, Hf, Ta and W; wherein
a reaction aqueous solution is formed by supplying a raw material aqueous solution including at least nickel and manganese, an aqueous solution including an ammonium-ion donor, and an alkali solution into a reaction tank and mixing; and
when crystallizing the nickel-manganese composite hydroxide particles, an oxygen concentration inside the reaction tank is controlled to be 3.0% by volume or less, a temperature of the reaction aqueous solution is controlled to be 35° C. to 60° C., and a nickel-ion concentration of the reaction aqueous solution is controlled to be 1,000 mg/L or more.

2. The method for producing nickel-manganese composite hydroxide particles according to claim 1 wherein the temperature of the reaction aqueous solution is 35° C. to 45° C.

3. The method for producing nickel-manganese composite hydroxide particles according to claim 1, wherein the pH value at a reference liquid temperature of 25° C. is controlled to be within a range of 10.5 to 13.0, and an ammonium-ion concentration is controlled to be within a range of 5 g/L to 25 g/L.

4. The method for producing nickel-manganese composite hydroxide particles according to claim 1, wherein at least one kind selected from among the group of sulfates, nitrates and chlorides is used as the nickel salt and manganese salt.

5. The method for producing nickel-manganese composite hydroxide particles according to claim 1, wherein at least one kind selected from among the group of ammonia, ammonium sulfate, and ammonium chloride is used as the ammonium-ion donor.

6. The method for producing nickel-manganese composite hydroxide particles according to claim 1, wherein a sodium hydroxide aqueous solution is used as the alkali solution.

7. The method for producing nickel-manganese composite hydroxide particles according to claim 1, wherein the nickel-manganese composite hydroxide particles are recovered by causing the reaction aqueous solution inside the reaction tank to overflow.

8. Nickel-manganese composite hydroxide particles comprising secondary particles formed by an aggregation of plural primary particles and expressed by a general formula: $Ni_xMn_yM_t(OH)_{2+\alpha}$,
where $0.05 \leq x \leq 0.95$, $0.05 \leq y \leq 0.95$, $0 \leq t \leq 0.20$, $x+y+t=1$, $0 \leq \alpha \leq 0.5$, and M is one or more elements selected from among Co, Ti, V, Cr, Zr, Nb, Mo, Hf, Ta and W, and the nickel-manganese composite hydroxide particles obtained from the method for producing nickel-manganese composite hydroxide particles according to claim 1; wherein the average particle size of the secondary particles is 7.0 μm to 25.0 μm, the index [(d90−d10)/the average particle size of the secondary particles] that indicates the spread of the particle-size distribution is 0.80 to 1.20, of the nickel-manganese composite hydroxide particles, the average value of the roundness of nickel-manganese hydroxide particles having a particle size that is 70% the average particle size of the secondary particles or more is 0.82 or greater, and the tap density of the nickel-manganese composite hydroxide particles is 2.20 g/cm³ or greater.

9. A method for producing cathode active material for a non-aqueous electrolyte secondary battery, comprising:
a mixing process for obtaining a lithium mixture by mixing a lithium compound with the nickel-manganese composite hydroxide particles disclosed in claim 8 or heat-treated particles that are obtained by heat treating the nickel-manganese composite hydroxide particles disclosed in claim 8; and
a calcination process for performing calcination of the lithium mixture in an oxidizing atmosphere at 720° C. to 1,000° C.

10. A cathode active material for a non-aqueous electrolyte secondary battery comprising layered hexagonal crystalline lithium composite oxide particles expressed by a general formula: $Li_{1+u}Ni_xMn_yM_tO_2$,
where $-0.05 \leq u \leq 0.50$, $0.05 \leq x \leq 0.95$, $0.05 \leq y \leq 0.95$, $0 \leq t \leq 0.20$, $x+y+t=1$, and M is one or more elements selected from among Co, Ti, V, Cr, Zr, Nb, Mo, Hf, Ta and W,
wherein
the average particle size of the secondary particles is 7.0 μm to 25.0 μm,
the index [(d90−d10)/the average particle size of the secondary particles] that indicates the spread of the particle-size distribution is 0.80 to 1.20,
the average value of the roundness of cathode active material having a particle size that is 70% the average particle size of the secondary particles or more is 0.82 or greater, and
the tap density is 2.20 g/cm³ or greater.

11. A non-aqueous electrolyte secondary battery comprising a cathode, an anode, a separator and a non-aqueous electrolyte, wherein
the cathode active material for a non-aqueous electrolyte secondary battery according to claim 10 is used as cathode material for the cathode.

* * * * *